United States Patent
Tuv et al.

(10) Patent No.: US 7,930,266 B2
(45) Date of Patent: Apr. 19, 2011

(54) METHOD FOR CLASSIFYING MICROELECTRONIC DIES USING DIE LEVEL CHERRY PICKING SYSTEM BASED ON DISSIMILARITY MATRIX

(75) Inventors: Eugene Tuv, Chandler, AZ (US); Somnath Shahapurkar, Chandler, AZ (US); Alexander Borisov, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 11/372,610

(22) Filed: Mar. 9, 2006

(65) Prior Publication Data

US 2007/0239652 A1   Oct. 11, 2007

(51) Int. Cl.
    *G06F 17/10*   (2006.01)
(52) U.S. Cl. .............................. 706/62; 703/2
(58) Field of Classification Search .................. 706/62; 703/2; 257/620; 361/749
    See application file for complete search history.

(56) References Cited

U.S. PATENT DOCUMENTS

| | | | |
|---|---|---|---|
| 5,394,509 A | 2/1995 | Winston | |
| 6,336,086 B1 | 1/2002 | Perez et al. | |
| 6,947,806 B2 | 9/2005 | Wang | |
| 6,965,895 B2 | 11/2005 | Smith et al. | |
| 2002/0030975 A1* | 3/2002 | Moon | 361/749 |
| 2005/0003633 A1 | 1/2005 | Mahle et al. | |
| 2005/0130333 A1 | 6/2005 | Zhong et al. | |
| 2005/0222828 A1* | 10/2005 | Dzhafarov et al. | 703/2 |
| 2005/0230850 A1* | 10/2005 | Taggart et al. | 257/784 |

OTHER PUBLICATIONS

Semiconductor Yield Analysis and Multi-Chip Package (MCP) Die Pairing Optimization using Statistical-Learning Goodwin, R.; Miller, R.; Tuv, E.; Borisov, A.; Electronic Packaging Technology, 2006. ICEPT '06. 7th International Conference, Aug. 26-29, 2006, pp. 1-10.*
J.F. Rohlf, "Methods of Comparing Classifications", Annual Review of Ecology and Systematics, Nov. 1974, vol. 5, pp. 101-113.*
"International Search Report and Written Opinion", PCT Application No. PCT/US2007/005254 (Aug. 7, 2007).
Notification Concerning Transmittal of International Preliminary Report on Patentability, Mailed Sep. 18, 2008, 6 pages.
CN PTO, "First Office Action", Chinese Application No. 200780004974.5, Office Action Issued Dec. 15, 2009. (2010), Whole Document.
Dzhafarov, Ehtibar N., et al.: ,Generalized Fechnerian Scaling, Cited in H. Colonius & E.N. Dzhafarov (Eds.), Measurement and Representation of Sensations (pp. 47-88). Mahwah, NJ: Erlbaum, 2006.
Dzhafarov, Ehtibar N., et al.: Psychophysics without physics: a purely psychological theory of Fechnerian scaling in continuous stimulus spaces, Journal of Mathematical Psychology, vol. 49, Iss 1, Feb. 2005, pp. 1-50; Abstract only, 4 pages.

(Continued)

*Primary Examiner* — Donald Sparks
*Assistant Examiner* — Ola Olude-Afolabi
(74) *Attorney, Agent, or Firm* — Blakely, Sokoloff, Taylor & Zafman LLP

(57) ABSTRACT

A computer implemented method for ordering a plurality of entities by computing a dissimilarity matrix based on a plurality of probabilities. The pluralities of probabilities are determined based on a plurality of classes. A weighted distance matrix is computed based the dissimilarity matrix. A plurality of rank ordered sequence candidates based at least in part on the sum of weighted distances between neighboring entities in the rank ordered sequence is calculated. Other embodiments are described in the claims.

24 Claims, 4 Drawing Sheets

OTHER PUBLICATIONS

Extended European Search Report mailed Mar. 29, 2010 for EP Application No. 07751982.5, 10 pages.
Campbell, A. M., "Aggregation for the Probabilistic Traveling Salesman Problem", *Computers and Operations Research*, vol. 33, No. 9, Apr. 11, 2005; pp. 2703-2724; XP024985300.
Cresswell, M. W., et al., "A Directed-Graph Classifier of Semiconductor Wafer-Test Patterns", *IEEE Transactions on Semiconductor Manufacturing*; vol. 5, No. 3; Aug. 1992; pp. 255-263; XP000360237.
Goodwin, R., et al., "Semiconductor Yield Analysis and Multi-Chip Package (MCP) Die Pairing Optimization Using Statistical-Learning", *Proceedings of the 7th International Conference on Electronic Packaging Technology (ECEPT '06)*; Aug. 26, 2006; XP031087649.
Han, Y., et al., "Automatic Classification Using Decision Tree and Support Vector Machine", *Lecture Notes in Artificial Intelligence*, vol. 3682; Aug. 17, 2005; pp. 1325-1330; XP019015484.
Hansen, M. H., et al., "A Computing Environment for Spatial Data Analysis in the Microelectronics Industry", *Bell Labs Technical Journal*; vol. 2, No. 1, 1997; pp. 114-129; XP002571769.
Hansen, C. K., et al., "Use of Wafer Maps in Integrated Circuit Manufacturing", *Microelectronics Reliability*, vol. 38, No. 6-8, Aug. 1998; pp. 1155-1164; XP002571768.
Hu, J., et al., "A Multi-Criteria Routing Model for Incident Management", *Proceedings of the 2005 IEEE Int'l Conf. on Systems, Man and Cybernetics*; vol. 1, Oct. 1, 2005; pp. 832-839; XP010874183.
Ichihashi, H., et al., "On Parameter Setting in Applying Dave's Noise Fuzzy Clustering to Gaussian Mixture Models", *Proceedings of the 2004 IEEE Int'l Conf on Fuzzy Systems*; vol. 3, Jul. 25, 2004; pp. 1501-1506; XP010755387.
Sankaran, C. M., et al., "Inspection in Semiconductor Manufacturing", *Wiley Encyclopedia of electrical and Electronics Engineering*; Dec. 27, 1999; pp. 242-262; XP002571770.

\* cited by examiner

METHOD FOR CLASSIFYING MICROELECTRONIC DIES USING DIE LEVEL CHERRY PICKING SYSTEM BASED ON DISSIMILARITY MATRIX

FIELD

Embodiments of the invention relate to data mining and machine learning, and their application to microelectronics manufacturing.

BACKGROUND

Data mining, also known as knowledge discovery in databases (KDD) has been defined as the nontrivial extraction of implicit, previously unknown, and potentially useful information from data. Many known techniques such as machine or statistical learning, are used to discover and present knowledge from databases in a form easily comprehensible to humans.

Machine learning usually refers to a change in a system that performs artificial intelligence based tasks, in response to input values. These input values are sometimes referred to as the observed variables or the training set. For example, after a speech recognition system has heard a number of voice samples, the system improves its speech recognition capability using a machine learning algorithm. This technique also has applications in other areas such as classifying DNA sequences, stock market analysis, predictions, and robotic controls. For example, a stock market analysis system may base on the historical stock performance in predicting future stock performance. The analysis system learns the historical stock performance and improves its ability to make more accurate predictions.

Microelectronic manufacturing companies have utilized machine learning to analyze the dynamic characteristics of manufacturing process related data sets. Such characteristics include final electrical performance binning, temperature variation during the process, chemicals usage, wafer sorting, clocking speed, and power consumption of the final packaged microelectronic devices.

Integrated circuits are typically manufactured on a wafer of silicon. Each wafer may contain several hundred integrated circuits (IC). The wafer is then divided into separate die or chips each containing an integrated circuit (IC). This process is also known as wafer saw. A die is a microelectronic device which has not yet been packaged.

There is an ever increasing demand for fast microelectronic devices that are capable of multitasking. Multi-chip package (MCP) technology provides a solution to achieve better multitasking by packaging more than one microelectronic die on a substrate. Subsequent to the wafer-saw, a Tape Reel Die System (TRDS) may be used to pick die from the wafer and place them on a tape reel in a sequence. The microelectronic die are then packaged, typically in the order in which they were received on the tape reel. Conventionally, the sequence in which a microelectronic die is picked from the wafer is hard coded in the TRDS and once the sequence is programmed in TRDS, it is not adjustable.

There may be hundreds of die in the same wafer and accordingly there are different ways of selecting the sets of die to be packaged on one substrate. One possibility is a simple, serpentine sequence in which adjacent die may be picked and packaged together, moving back and forth in rows. For example, the TRDS pick-and-place arm may start at the upper left die, travels across the row, and wraps back towards the left at the subsequent row. Another possibility is a spiral sequence in which adjacent die may be picked and packaged together, in a circular sequence staring from an outer most row, traveling down an outer column, across another outer row then up another outer column, and continuing inwards.

The particular microelectronic die should be packaged together depend greatly on the quality of each die. Conventionally, die with similar qualities are packaged together. The quality of each microelectronic die depends on its manufacturing process and the processing environment. A manufacturing process has temperature variations and uneven chemical distributions which result in defective microelectronic devices, or devices having different characteristics and qualities. Die with difference qualities should not be packaged in the same MCP. For example, if the clocking of each die in a MCP does not match with other die packaged on the same MCP, the performance and the sales distribution of that packaged unit may be limited by the die with the lowest clock speed. Consequently, this MCP may result in lower performance and lower profit yield.

BRIEF DESCRIPTION OF THE FIGURES

Various embodiments of the invention are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

In the following description, numerous specific details are set forth with respect to FIGS. 1-4. However, it is understood that those of ordinary skill in the art will appreciate that the description given herein is for explanatory purposes only and is not intended to limit the scope of the invention.

While an embodiment of the invention is described with respect to microelectronic die pairing for multi-chip packaging, those skilled in the art will appreciate that the method described herein may also be used in other applications, for example, experimental data analysis in medicine and physics, market and customer analysis, manufacturing data exploration, supply-chain and automated spam detection.

These embodiments described herein are sufficient to enable those skilled in the art to practice the various embodiments of the invention, and it is to be understood that other embodiments may be utilized and that logical, mechanical, electrical, and other changes may be made without departing from the scope of the invention subject matter. Accordingly, the scope of the invention is not to be limited by the example provide herein.

Figure 1:
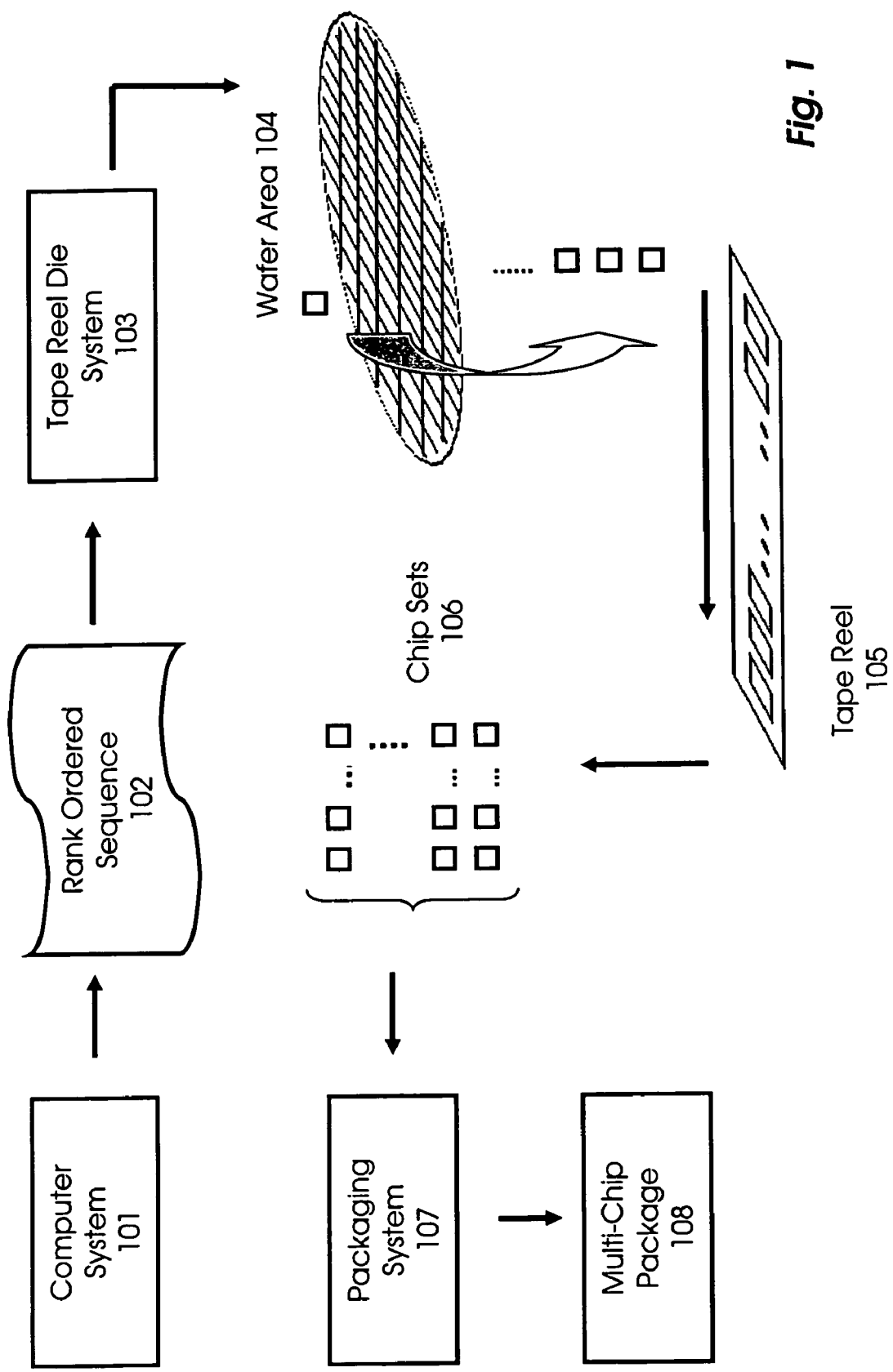
FIG. 1 is a block diagram illustrating an overview of how an embodiment of the invention can be used in a microelectronic manufacturing environment.

FIG. 1 is a block diagram illustrating an overview of an embodiment of the invention in which a multi-chip package (MCP) 108 may be manufactured. A computer system 101 provides a rank ordered sequence 102 to the tape reel die system (TRDS) 103 where the rank ordered sequence specifies the order in which microelectronic die are to be picked from a wafer area 104 and placed on a tape reel 105 for packaging. The TRDS 103 may be implemented in part using the same physical hardware as computer system 101 or it may be a separate computer system. The TRDS 103 also includes a mechanical device for picking and moving the microelectronic die or chips, such as a robotic arm.

After the microelectronic die are picked up by the TRDS 103 from the wafer area 104, they are placed on the tape reel 105. There, the die may be arranged sequentially, in the order they were picked. As an alternative, the die may be arranged in sets where each set of two or more die may be place on the tape reel side by side. The first die placed on the tape reel 105 is typically the first die to be packaged by the packaging system 107.

In MCP manufacturing, multiple die are grouped into a set of chips 106 before packaging. In one embodiment of the invention, the grouping may be done by the order of the die delivered by the tape reel 105. For example, in a two die MCP, the first two die arriving at the packaging system 107 may be packaged in the same multi-chip package 108, and the two die subsequent to the first two die may be packaged in another multi-chip package 108.

Figure 2:
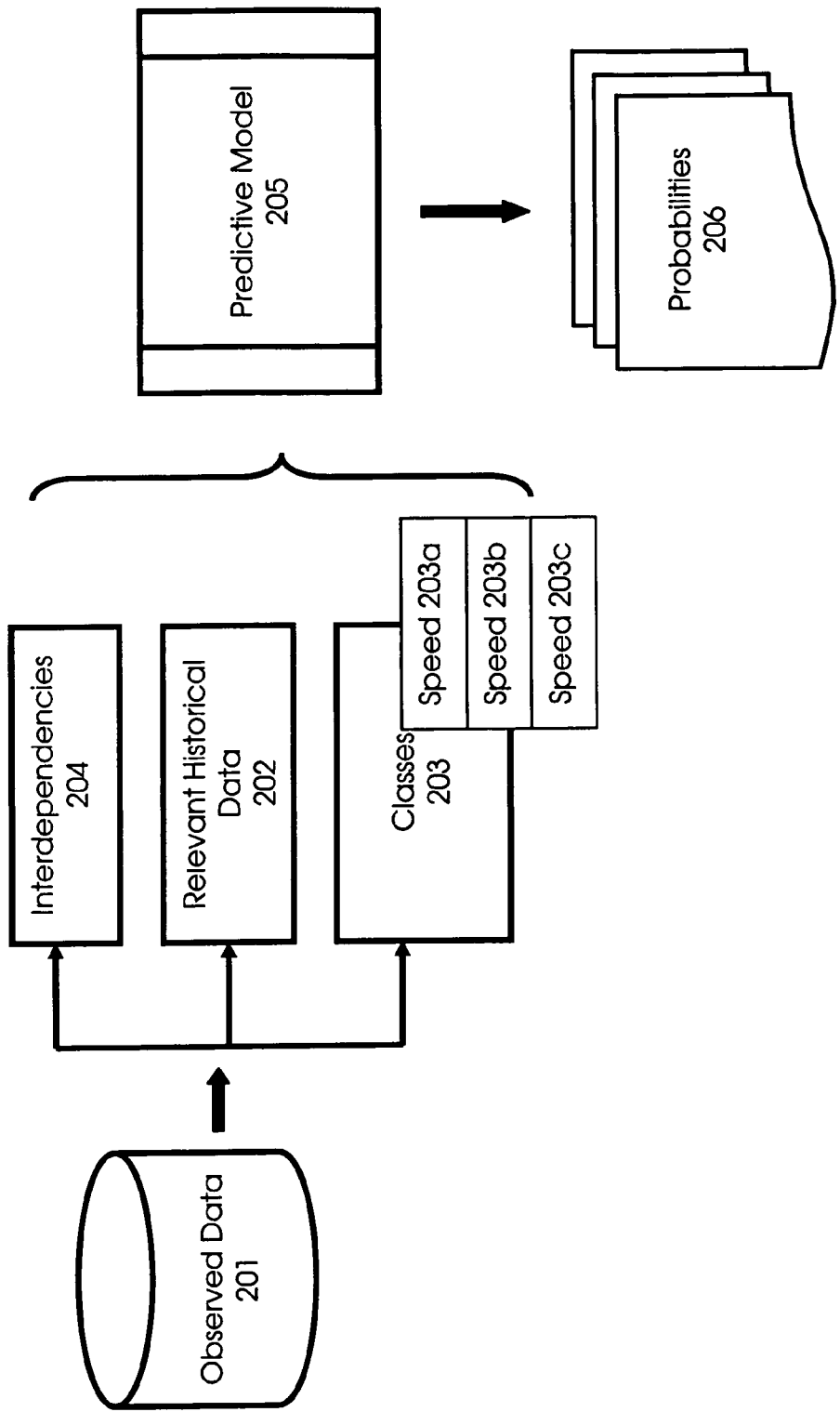
FIG. 2 is a flowchart illustrating a general method for selecting a rank ordered sequence in accordance with an embodiment of the invention.

FIG. 2 is a flowchart illustrating a method for selecting a rank ordered sequence using a machine learning algorithm, in accordance with an embodiment of the invention. As noted previously, machine learning is a technique that changes the behavior of a system in response to the input values the system receives.

In one embodiment of the invention, observed data 201 refers to the manufacturing related data collected from previously performed manufacturing processes, for example, temperature variation during the process, chemicals usage, clocking speed and power consumption of the final packaged microelectronic devices. Some of the observed data 201 may affect other observed data 201. For instance, a combination of temperature variation and chemicals usage may cause the final packaged devices to have different qualities such as different power consumption or final tested speed. Therefore, interdependencies 204 between different types of the observed data 201 may be studied and defined.

In addition to being used for determining the interdependencies 204, the observed data 201 may be classified or categorized in several ways. For example, microelectronic die may be classified based on their final tested speed. Other characteristics of the die may also be used as the basis of classification. As noted previously, uneven chemical distributions may cause microelectronic die to have different characteristics and qualities. In this example, classes 203 may be divided into several classes each defining a different performance level, such as speed 203a, speed 203b, and speed 203c.

A categorization system such as Die Level Cherry Picking (DLCP) may be used to categorize the microelectronic die from a wafer into several other categories or classes, based on their characteristics. Categories or classes may also be determined by methods other than DLCP, depending on the type of the characteristics used for classification.

In a typical microelectronic manufacturing operation such as for producing PENTIUM™ processors by Intel Corp., Santa Clara, Calif., the quantity of the observed data 201 may be measured on the order of terabytes, because of the large quantity of microelectronic devices manufactured. To efficiently process the large amount of the observed data 201, a subset of the observed data 201 that is relevant to determine the classes 203 may be parsed out as relevant historical data 202.

In one embodiment of the invention, a predictive model 205 may be built to accept the interdependencies 204, the relevant historical data 202, and the classes 203 to predict unknown values of future variables. For example, the interdependencies determined from a previously completed manufacturing process such as the relationship between temperature variation, chemicals distributions, and pre-package speed of the die, may be used to predict the unknown packaged final speed of future microelectronic die that may be manufactured using, for example, the same process. Existing predictive models such as a tree-based classifier or Random Forest classifier may also be used.

Resulting from the predicative model 205 are probabilities 206. The probabilities 206 represent the probabilities of one or more microelectronic die being classified in the classes 203. For example, where there are two die to be cut from a wafer and two classes in which each die may be categorized, there may be two sets of probabilities 206. One set represents the probability of the first die being classified in the first class, and the probability of the first die being classified in the second class. The second set represents the probability of the second die being classified in the first class and the probability the second die being classified in the second class.

In one embodiment of the invention, the probabilities 206 may be represented in the form of vectors. For example, $$P_2 = [p_{21}, p_{22}] = [0.4, 0.6]$$

$P_2$ denotes a probability vector wherein its elements represent the probabilities of die number 2 being in each of the two classes. In this example, the likelihood that the second die will be in class 2 is 0.6 or 60%.

In one embodiment of the invention, the plurality of the probabilities 206 may be represented in the form of matrices. For example, $$M = \begin{bmatrix} 0.2, 0.1, 0.3, 0.2, 0.2 \\ 0.1, 0.5, 0.1, 0.2, 0.1 \\ 0.1, 0.2, 0.4, 0.1, 0.2 \end{bmatrix}$$

In this example, M denotes a probability matrix for three difference die. The rows represent the probabilities of die number 1, 2 and 3 being classified in each of 5 classes, respectively.

Figure 3:
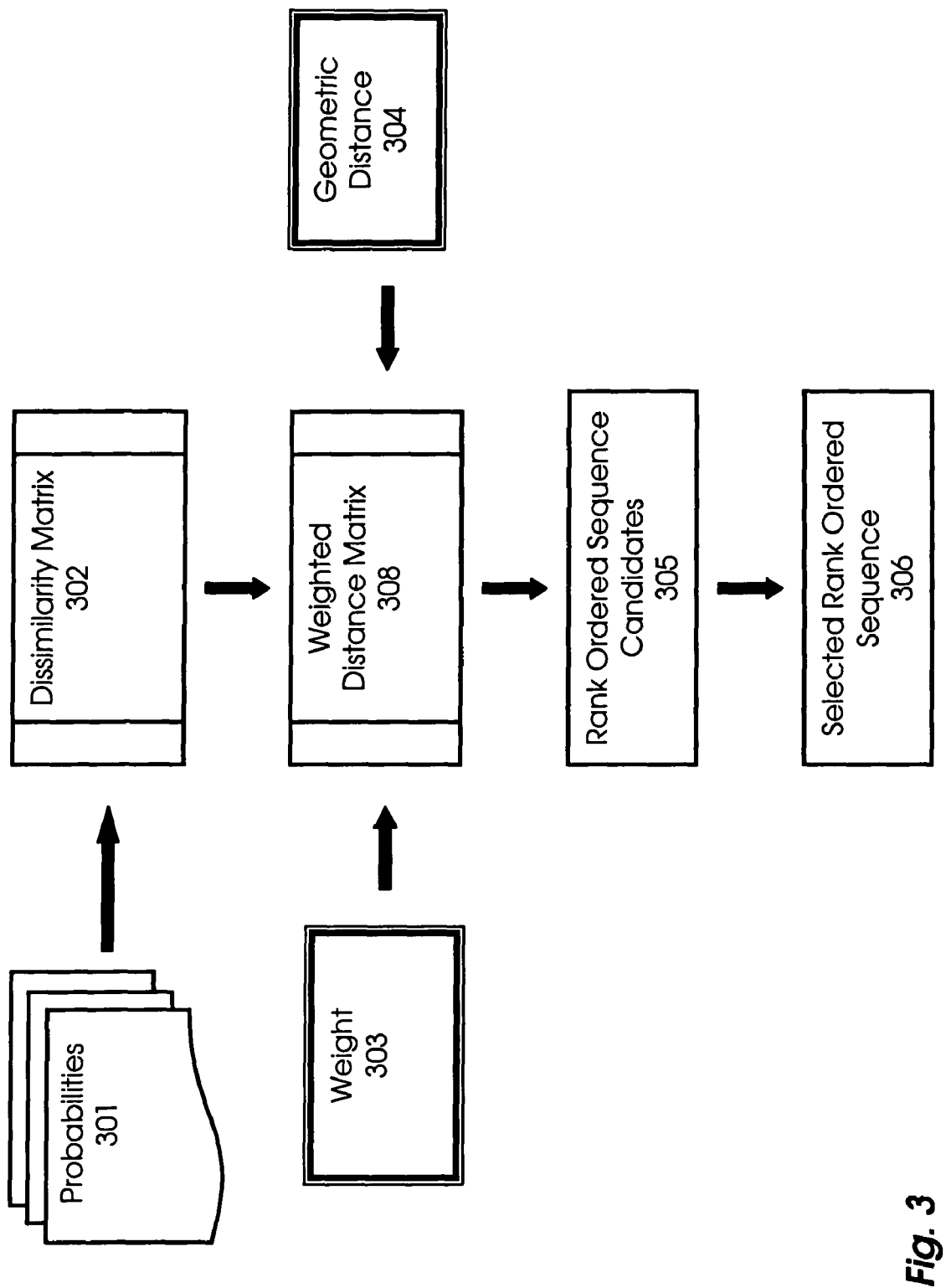
FIG. 3 is a flowchart illustrating the creation and use of a dissimilarity matrix and a weighted matrix in accordance with an embodiment of the invention.

FIG. 3 is a flowchart illustrating an example method for creating a dissimilarity matrix, a weighted distance matrix, and rank ordered sequence candidates. Dissimilarity matrices are often used to represent the relationship or dissimilarity between two sets of entities. It may be a representation of the "unlikeness" of two sets of entities.

In one embodiment of the invention, a two dimensional dissimilarity matrix 302 may be used to represent the likelihood or probabilities that any two of a given group of microelectronic die are categorized in the same class. Dissimilarity matrix 302 is constructed using probabilities 301. A method of determining the probabilities 301 is illustrated in FIG. 2. Once the probability of a given microelectronic die in a given class is determined, the probability of any two microelectronic die being in the same class may also be determined by the product of these two probabilities. For example, if the probability of a first die in a first class is 0.3 and denoted as $p_{11}$ and the probability of a second die in the first class is 0.7 and denoted as $p_{21}$, the probability that both of the die in first class would be 0.21.

Based on the product probability described above, the dissimilarity matrix 302 may be computed. In one embodiment of the invention, the dissimilarity matrix 302 may be computed according to the following formula:

$$s_{km} = 1 - \sum_{i=1}^{q} p_{ki} p_{mi}$$

Each element of the matrix, $s_{km}$ represents the dissimilarity between die k and die m. $p_{ki}$ represents the likelihood that entity k is in class i, $p_{mi}$ represents the likelihood that entity m is in class i, and q represents the number of classes. In a microelectronic manufacturing domain, each $s_{km}$ may represent the likelihood that die k and die m are not in the same class.

Subsequent to computing the dissimilarity matrix 302, a weighted distance matrix 308 may be computed. The weighted distance matrix 308 represents the weighted distance between any two of a given group of microelectronic die. In one embodiment of the invention, the weighted distance matrix 308 may be computed according to the following formula:

$$d_{km} = W \cdot g_{km} + s_{km}$$

where $d_{km}$ represents the weighted distance between die k and die m, W represents weight 303, $g_{km}$ represents a geometric distance 304, and $s_{km}$ is the associated dissimilarity from the dissimilarity matrix 302, between die k and die m.

The association between the dissimilarity matrix 302 and the weighted distance matrix 308 may be made in several ways. In this embodiment of the invention, there is a one to one association between the dissimilarity matrix 302 and the weighted distance matrix 308. The number of elements in the weighted distance matrix 308 may be the same as the number of elements in the dissimilarity matrix 302.

The geometric distance 304, or $g_{km}$ as depicted in the above equation, represents the actual and measured distance between two die. For example, the geometric distance between two adjacent in the same wafer area microelectronic die could be one inch. In this embodiment of the invention, the microelectronic die are distributed on a plane in the wafer area, each with (X,Y) coordinates. Other physical arrangements and coordinate systems for the items to be selected are possible.

W, as described above, represents the weight 303 that may be applied to the geometric distance 304 to determine the importance given to each of the geometric distances 304. For example, if the weight 303 is set to a sufficiently small number, the geometric distance 304 between the two given die is ignored. Conversely, if the weight 303 is set to a sufficiently large number, the geometric distance 304 between the two given die may be fully considered in computing the weighted distance matrix elements. The weight 303 may be determined by any method, such as a predefined algorithm or manually determined by one skilled in the art.

Figure 4:
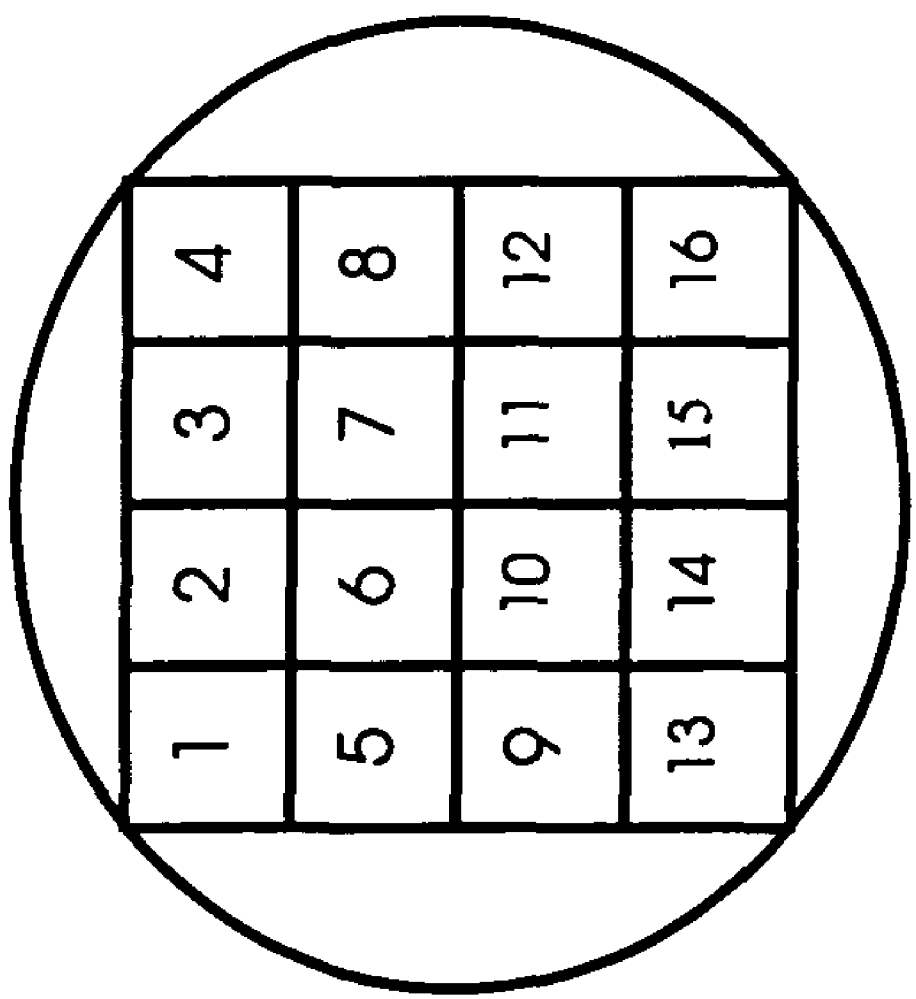
FIG. 4 is a diagram illustrating an example wafer having 16 die.

The rank order sequence candidates 305 represent a set of two or more sequences where each sequence includes representations of all the microelectronic die to be picked from a given wafer area. For example, if 16 die are cut from a wafer, each sequence would contain 16 elements. FIG. 4 is a diagram illustrating an example wafer having 16 die. A sequence depicted as [16, 9, 12, 10, 11, 2, 5, 15, 6, 1, 13, 3, 8, 14, 7, 4] would represent that the sixteenth die will be picked first, then the ninth, then the twelfth, etc. Other sequences will have the die in different orders.

In one embodiment of the invention, the weighted distance matrix 308 is used to determine the rank ordered sequence candidates 305. In the example above where a wafer has 16 die, there are (16-1)! possible ways to construct the sequences. The sum of geometric distance between the neighboring elements in the sequence determine the total length that a machine, such as the tape reel die system 103, travels while picking die from a wafer area 104 to the tape reel 105. Among all the possible sequences, one sequence may result a minimum sum. The sequence with a minimum or the smallest sum may be chosen as a selected rank ordered sequence 306. The selected rank ordered sequence 306 may be the "best" or "optimal" sequence that TRDS 103 from FIG. 1 needs to "travel" when picking and moving the microelectronic die from wafer area 104 from FIG. 1, and placing them on the tape reel 105.

The embodiments of the invention have been described in the context of microelectronic manufacturing, however, it is to be understood that other applications may utilize the embodiments described herein. For example, applications such as market and customer analysis where prediction the customer's choice of products based on their past purchasing history in combination with the needs to determine an optimal store location closest to each customer, may utilize the embodiments described herein.

Although the embodiments of the invention have been described in detail hereinabove, it should be appreciated that many variations and/or modifications and/or alternative embodiments of the basic inventive concepts taught herein that may appear to those skilled in the pertinent art will still fall within the spirit and scope of the invention as defined in the appended claims.

We claim:

1. A computer implemented method for ordering a plurality of microelectronic dies, the computer implemented method comprising:
   computing a dissimilarity matrix based on a plurality of probabilities of classifications, wherein the classifications are determined by a characteristic of each microelectronic die of the plurality of microelectronic dies, wherein each microelectronic die of the plurality includes an integrated circuit, wherein the characteristic includes clocking speed of each microelectronic die of the plurality of microelectronic dies, and wherein the characteristic of each microelectronic die is classified by a die level cherry picking system;
   computing a weighted distance matrix based on the following: the dissimilarity matrix, weighted distances between at least one pair of the microelectronic dies of the plurality of microelectronic dies, and geometric distances between neighboring microelectronic dies of the plurality of microelectronic dies;
   generating a plurality of rank ordered sequence of candidates representing the plurality of microelectronic dies, the generating is based on the weighted distance matrix; and
   selecting, from the plurality of rank ordered sequence of candidates, a rank ordered sequence representing the order of the plurality of microelectronic dies, the selecting based on a sum of weighted distances between neighboring microelectronic dies in the rank ordered sequence.

2. The computer implemented method of claim 1, wherein the sum of weighted distances is a smallest sum from among the rank ordered sequence of candidates.

3. The computer implemented method of claim 1, wherein the characteristic of each microelectronic die comprises: chemical usage, wafer sorting, power consumption, and electrical performance binning.

4. The computer implemented method of claim 1, wherein the dissimilarity matrix includes dissimilarity elements $S_{km}$, such that $$S_{km} = 1 - \sum_{i=1}^{q} P_{ki} P_{mi}$$

wherein $p_{ki}$ and $p_{mi}$, denotes the probabilities of classifications that microelectronic dies k and m are in class i, respectively, and wherein q is the number of the plurality of classes.

5. The computer implemented method of claim 1, wherein the weighted distance matrix includes elements $d_{km}$, such that $$d_{km} = W \cdot g_{km} + S_{km}$$

wherein W represents a weight applied to the geometric distance to assign a degree of importance to the geometric distance, and wherein $g_{km}$ represents the geometric distance between the microelectronic dies k and m.

6. The computer implemented method of claim 1, wherein generating the plurality of rank ordered sequence of candidates further comprising applying a one dimensional scaling to the weighted distance matrix.

7. The computer implemented method of claim 1, further comprising:
determining based on historical data the plurality of probabilities of classifications for each of the microelectronic die of the plurality of microelectronic dies; and
retrieving the plurality of microelectronic dies from a container containing the plurality of microelectronic dies, the retrieving based on the rank ordered sequence.

8. The computer implemented method of claim 7, wherein the container is a wafer containing the plurality of microelectronic dies.

9. The computer implemented method of claim 1, wherein the weighted distance matrix and the dissimilarity matrix have equal number of elements.

10. The computer implemented method of claim 1, wherein the plurality of microelectronic dies is contained in a wafer.

11. A computer implemented system for ordering a plurality of microelectronic dies, the computer implemented system comprising:
a memory to store historical data;
means for determining, based on the historical data, a plurality of probabilities of classifications, wherein the classifications are determined by a characteristic of each microelectronic die of the plurality of microelectronic dies, and wherein each microelectronic die of the plurality includes an integrated circuit, wherein the characteristic includes clocking speed of each microelectronic die of the plurality of microelectronic dies, and wherein the characteristic of each microelectronic die is classified by a die level cherry picking system;
means for representing a dissimilarity between a first microelectronic die and a second microelectronic die based on the determined probability, wherein the first and the second microelectronic dies from the plurality of microelectronic dies; means for representing a weighted distance between the first microelectronic die and the second microelectronic die based on a weight, the means for representing the weighted distance based on a geometric distance and the dissimilarity between the first microelectronic die and the second microelectronic die;
means for generating, via the means for representing the weighted distance, a plurality of rank ordered sequence of candidates representing the plurality of microelectronic dies; and
means for selecting, from the plurality of rank ordered sequence of candidates, a rank ordered sequence representing the order of the plurality of microelectronic dies, the means for selecting based on a sum of weighted distances between neighboring microelectronic dies in the rank ordered sequence.

12. The computer implemented system of claim 11, wherein the sum of weighted distances is a smallest sum from among the rank ordered sequence of candidates.

13. The computer implemented system of claim 11, wherein the means for determining the plurality of probabilities of classifications is based on an artificial intelligence based module which includes a random subspace classifier.

14. The computer implemented system of claim 11, wherein dissimilarity between the first microelectronic die and the second microelectronic die is determined according to the formula:

$$S_{km} = 1 - \sum_{i=1}^{q} P_{ki} P_{mi}$$

wherein $p_{ki}$ and $p_{mi}$ denotes the probabilities of classifications that microelectronic dies k and m being classified as class i, respectively, and wherein q is the number of plurality of classes.

15. The computer implemented system of claim 14, wherein the weighted distance between the first microelectronic die and the second microelectronic die is determined according to the formula:

$$d_{km} = W \cdot g_{km} + S_{km}$$

wherein $d_{km}$ is the weighed distance between microelectronic dies k and m, wherein W represents a weight applied to the geometric distance to assign a degree of importance to the geometric distance, and wherein $g_{km}$ represents the geometric distance between the microelectronic die k and microelectronic die m.

16. The computer implemented system of claim 11, wherein the means for representing a weighted distance and the means for representing a dissimilarity have equal number of elements.

17. The computer implemented system of claim 11, wherein the plurality of microelectronic dies is contained in a wafer.

18. A machine-accessible storage medium that provides instructions that, when executed by a processor, causes the processor to:
compute a dissimilarity matrix based on a plurality of probabilities of classifications and a plurality of microelectronic dies, wherein the classifications are determined based on a characteristic of each of the plurality of microelectronic dies, wherein each microelectronic die of the plurality includes an integrated circuit, wherein the characteristic includes clocking speed of each microelectronic die of the plurality of microelectronic dies, and wherein the characteristic of each microelectronic die is classified by a die level cherry picking system;
compute a weighted distance matrix based on the following: a weighted distance between one pair of the microelectronic dies of the plurality of microelectronic dies, a geometric distance between a first microelectronic die and a second microelectronic die from the plurality of microelectronic dies, and the dissimilarity matrix;

generate a plurality of rank ordered sequence of candidates representing the plurality of microelectronic dies, the generating is based on the weighted distance matrix; and select, from the plurality of rank ordered sequence of candidates, a rank ordered sequence representing the order of the plurality of microelectronic dies, the selecting based on a sum of weighted distances between neighboring microelectronic dies in the rank ordered sequence.

19. The machine-accessible storage medium of claim 18, wherein the sum of weighted distances is a smallest sum from among the rank ordered sequence of candidates.

20. The machine-accessible storage medium of claim 18, wherein the dissimilarity matrix includes dissimilarity elements $s_{km}$, such that $$S_{km} = 1 - \sum_{i=1}^{q} P_{ki} P_{mi}$$

wherein $p_{ki}$ and $p_{mi}$ denotes the probabilities that microelectronic dies k and m being classified as class i, respectively, and wherein q is the number of classes.

21. The machine-accessible storage medium of claim 20, wherein the weighted distance matrix includes elements $d_{km}$ such that $$d_{km} = W \cdot g_{km} + S_{km}$$

wherein W represents a weight applied to the geometric distance to assign a degree of importance to the geometric distance, and wherein $g_{km}$ represents the geometric distance between the first microelectronic die k and the second microelectronic die m.

22. The machine-accessible storage medium of claim 18, wherein the plurality of rank ordered sequence of candidates is generated by instructions that when executed on the processor cause the processor to apply a one dimensional scaling to the weighted distance.

23. The machine-accessible storage medium of claim 18, wherein the weighted distance matrix and the dissimilarity matrix have equal number of elements.

24. The machine-accessible storage medium of claim 18, wherein the plurality of microelectronic dies is contained in a wafer.

\* \* \* \* \*